Sept. 20, 1932.  C. HARRIS  1,878,983
MOTOR BASE
Filed Sept. 9, 1930  2 Sheets-Sheet 1

INVENTOR
Cleo Harris
BY
Wood & Word ATTORNEYS

Sept. 20, 1932.   C. HARRIS   1,878,983
MOTOR BASE
Filed Sept. 9, 1930   2 Sheets-Sheet 2

INVENTOR
Cleo Harris
BY
Wood & Wood ATTORNEYS

Patented Sept. 20, 1932

1,878,983

UNITED STATES PATENT OFFICE

CLEO HARRIS, OF CINCINNATI, OHIO, ASSIGNOR TO THE CINCINNATI BALL CRANK COMPANY, OF CINCINNATI, OHIO, A CORPORATION OF OHIO

MOTOR BASE

Application filed September 9, 1930. Serial No. 480,756.

This invention relates to motor supports or bases and is particularly directed to that type of support which is adjustably mounted and yieldingly urged for tensioning the driving belt connected between the motor or driving pulley and the driven pulley.

Since the motor pulley is disposed at one end of the motor, the result is that the tension of the belt applied at that side of the motor tends to twist the motor base on its support. To put the proper tension on the belt for a positive drive and non-slippage over the pulleys, it is necessary that considerable tensioning force or thrust be exerted on the belt. For the purpose of tensioning the belt the motor base is slidably mounted on the frame for movement toward and from the driven pulley and in this instance preferably on rails as a fabricated part of the frame of the machine to which the motive power is applied.

It is an object of this invention to provide a motor base having elongated one-piece bearings at right angles to the axis of the motor shaft, these bearings preventing binding because of twisting of the base on its slide bearings under the tension thrust imparted from the base to the belt by way of the pulley of the motor. The use of long one-piece or continuous bearings, presenting fewer binding edges and providing greater area of contact, affords a greater and more uniform distribution of the lateral or twisting thrusts to the slide bearings rods or rails.

Another object is to provide that the base is sectional and that the sections are adjustable relative to the bearings to accommodate for variation in motor size or location of bolt holes in the motor.

It is another object of this invention to provide a slightly off-set application of spring tension to the motor base for urging the same under spring tension along its rails for tightening the belt, the tension being applied slightly toward the pulley end of the motor whereby the tendency for the motor base to rock on its bearings is greatly lessened as the belt is drawn tautly between its pulleys. The effect of this off-set application of spring tension is to balance the forces applied to the base, namely, the tension in the belt applied to the pulley of the motor and the means for applying the tension through the base to the pulley.

Another object relates to the general construction of the motor base and its mounting wherein the same is exceedingly simple and wherein the device for compressing or releasing the spring for adjusting the tension on the belt is easily operable.

Further objects and advantages will be more fully apparent from a description of the accompanying drawings, in which.

Figure 1:
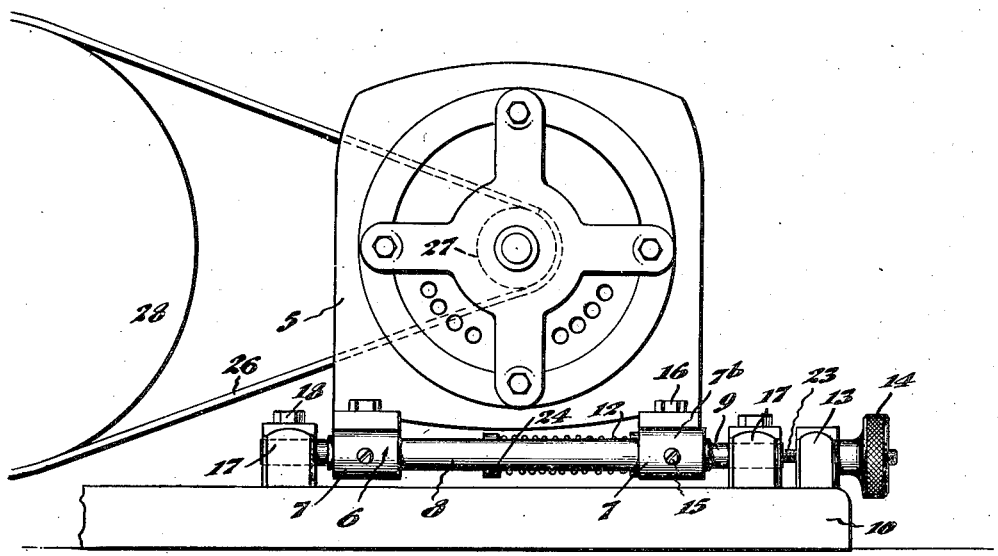
Figure 1 is a side view of the motor base showing it mounted on the frame of an air compressor and illustrating the motor in position thereon with the belt drawn taut by means of the adjustable yieldable device.
Figure 4:
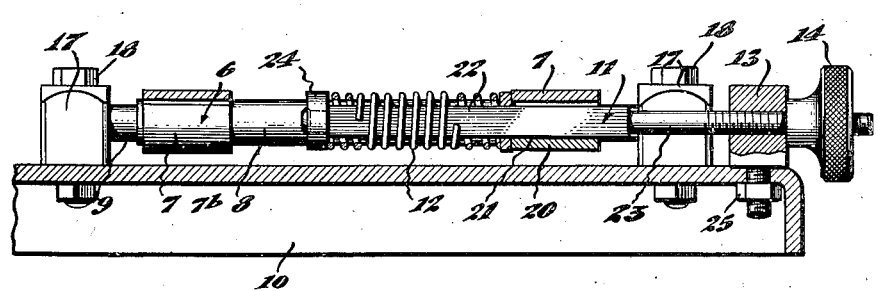
Figure 4 is a longitudinal sectional view taken on line 4—4, Figure 2, detailing the adjusting means for the belt tensioning device.
Figure 2:
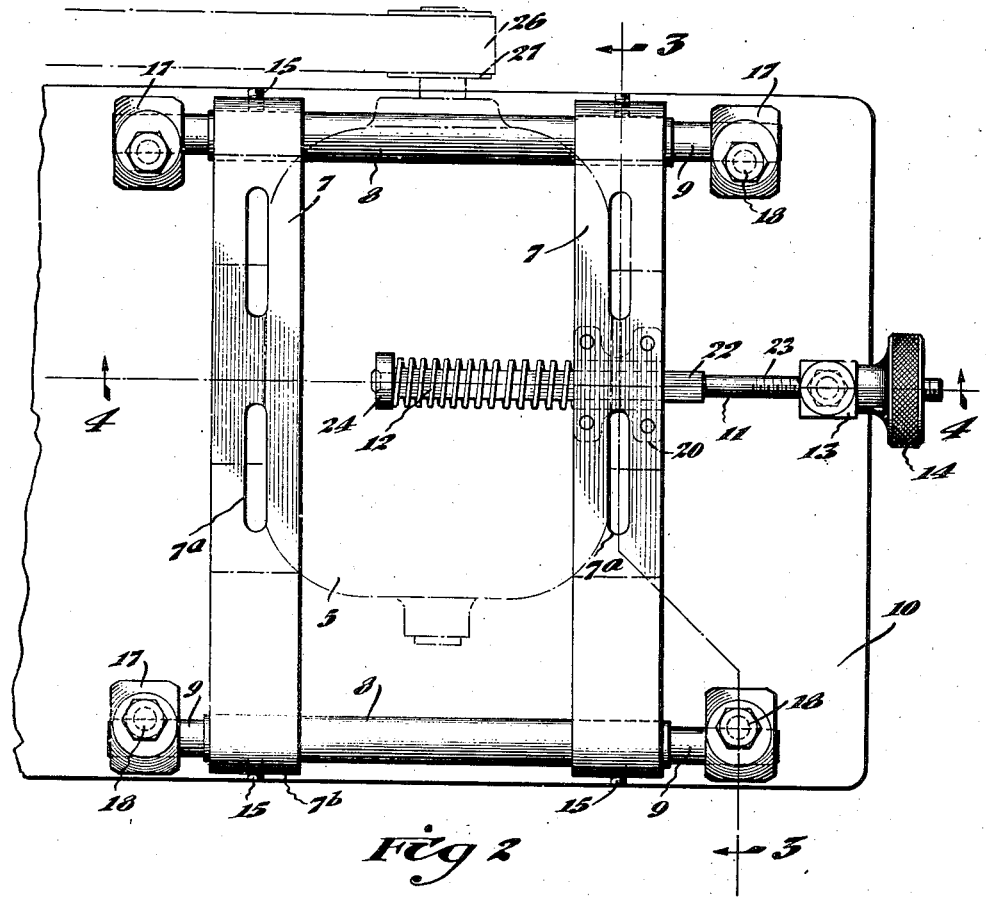
Figure 2 is a top plan view of the motor base showing a fragmentary portion of the frame of the machine and illustrating the motor base with the motor removed.
Figure 3:
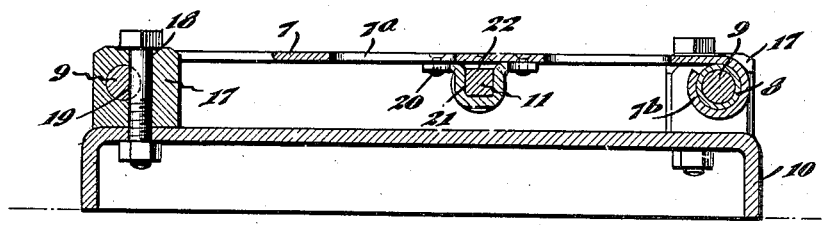
Figure 3 is a sectional view taken on line 3—3, Figure 2, illustrating the mounting of a cross member of the base and the association of the belt tensioning device with a particular member.

The motor indicated at 5 has the bolt holes, for attaching the same to the base, drilled in its feet in the conventional manner. It frequently occurs that there is a slight variation or inaccuracy in the spacing of the bolt holes. The motor base 6 is designed for adjustment to accommodate for variation in the spacing of the bolt holes as well as being designed for use with various size motors. The motor base consists of a pair of parallel cross members 7—7 including bolt holes 7ª and having their adjacent ends joined by bearing sleeves 8—8 and adjustably attached to the bearing sleeves. This motor support or base assembly is mounted on rods or support rods or rails 9—9, one for each sleeve, the rails being a fixed part of the frame 10 of the machine.

The belt tensioning device, including adjustment means, is associated with one cross member of the base and consists of a headed rod 11 slidably mounted in a bracket of the cross member and a spring 12 compressed between the head and cross member, the opposite extended end passing through a member 13 of the frame and having screw threads thereon engaged by an adjustment nut 14 engaging the member of the frame.

More specifically described, the cross members 7—7 are formed of strap iron, each having its respective ends bent into the form of a tube as at 7$^b$. These bearing ends of the cross members are adjustably slidably mounted upon the respective sleeves. Normally, the cross members and the bearing sleeves are a rigid unitary structure, the members being secured by means of set screws 15 in each formed end engaging the sleeves. When it is necessary to change the spaced relation of the cross members for accommodating a particular motor bolt hole spacing, the set screws are loosened permitting adjustment of the cross members on the bearing sleeves.

Each member 7 is provided with a pair of longitudinally disposed slots or elongated bolt holes 7$^a$ for the motor attachment bolts 16, the slots permitting crosswise or lateral adjustment of the motor on the base.

The rails or mounting elements for the respective bearing sleeves are secured in blocks 17 mounted on the frame 10 of the machine to which the motor is delivering motive power. These support blocks are secured to the frame by means of bolts 18, the bolts disposed vertically and passing through tangential slots 19 in the respective ends of the slide rods for the purpose of preventing rotative or longitudinal displacement of these rods.

The cross member disposed toward the outer end of the machine has a bracket 20 secured to its underside, this bracket including a square bore 21 extending parallel with the support rods. The adjustment rod 11 includes a square portion 22 and a round screw-threaded portion 23. The square portion is disposed through the square bore of the bracket and includes a head 24 at its inner end.

The coil spring 12 is disposed under compression between the head and the inner face of the bearing bracket. The screw-threaded end of the screw rod passes loosely through the journal block or member 13 of the frame, which has a downwardly extending screw-threaded stud passing through the frame maintained in position by means of a nut 25 on its extended end. The end of the rod extending beyond the journal block carries the knurled nut 14 thereon, the nut engaging the outer face of the journal block for adjusting the belt tension device by compressing or loosening the spring as the occasion may demand.

The motor being rigidly bolted to the slidable or floating base and the belt 26 extended between the pulley 27 of the motor and the driving wheel or pulley 28 of the machine which is being driven, the result of the engagement of the spring under tension against the element of the motor base is to place the belt under tension between the respective driving and driven pulleys. This tension may be accurately governed by rotating the adjustment nut.

The adjustment screw rod extends parallel to the support rods or rails and is disposed slightly toward the pulley end of the motor for counteracting the force exerted from the belt through the motor pulley tending to rock the motor base or twist the same on its sleeve bearing, and thereby lessening the tendency for the motor base to bind on its support rods.

The bearing sleeves each have continuous or uninterrupted contact with their support rails. The only bearing edges presented are at the respective ends of the sleeves. These one-piece extremely long bearings, due to greater area of contact, provide greater and more uniform distribution of twisting thrusts against the support rails and eliminate any possibility of frictional bind between bearings and support rods.

Having described my invention, I claim:

1. In a device of the class described for tensioning a belt between a driven pulley and the driving pulley of a motor, a motor base including cross members and bearing sleeves of elongated form joining the adjacent ends of said cross members, a frame including a support rod for each bearing sleeve, and means engaging said base for urging the same along the rods to draw the belt tautly between the pulleys.

2. In a device of the class described for tensioning a belt between a driven pulley and the driving pulley of a motor, a motor base including cross members and bearing sleeves of elongated form joining the adjacent ends of said cross members, a frame including a slide rod for each bearing sleeve, a device yieldingly engaging said base for urging the same along the rails to draw the belt tautly between the pulleys, and means for adjusting the device to variably tension the belt.

3. A motor base including the driving pulley of the motor, a driven pulley and a belt between the respective pulleys, comprising, an attaching plate, elongated bearing sleeves at respective ends of the plate, a frame providing rails, said elongated bearing sleeves slidably disposed on the respective rails, a headed rod slidably and non-rotatively mounted relative to the plate and disposed through a member of the frame, a spring compressed between the head of the rod and the base plate, and a nut engaging the end of the rod extended through the frame and abutting the member of the frame for adjusting the compression of the spring and placing a yielding force on the motor base for drawing the belt taut between the respective pulleys.

4. An adjustable motor base, comprising, a pair of cross members including formed tubes at each end thereof, bearing sleeves slidably disposed through the tubular portions of adjacent ends of the cross members, means for adjustably securing the cross members on the sleeves, a frame including support rails for the respective sleeves, and means for adjusting the position of the motor base on the rails.

5. An adjustable motor base for tensioning a belt between a motor pulley and a driven pulley, comprising, cross members, bearing sleeves of elongated form joining the respective adjacent ends of the cross members, a frame having support rods extending through the respective bearing sleeves for slidably supporting the base, means for mounting the motor upon said cross members with the axis of its shaft at right angles to the bearing sleeves, and a device engaging the motor base off-center toward the pulley end thereof for slidably adjusting the motor base on the support rods for appropriately tensioning the belt.

In witness whereof, I hereunto subscribe my name.

CLEO HARRIS.